United States Patent [19]

Sato et al.

[11] Patent Number: 4,752,554
[45] Date of Patent: Jun. 21, 1988

[54] OPTICAL INFORMATION RECORDING MEDIUM

[75] Inventors: Tsutomu Sato; Hideaki Oba, both of Yokohama, Japan

[73] Assignee: Ricoh Co., Ltd., Tokyo, Japan

[21] Appl. No.: 870,201

[22] Filed: Jun. 2, 1986

Related U.S. Application Data

[63] Continuation of Ser. No. 666,401, Oct. 30, 1984, abandoned.

[30] Foreign Application Priority Data

Nov. 2, 1983 [JP] Japan .................. 58-206795
Nov. 22, 1983 [JP] Japan .................. 58-219739
Nov. 24, 1983 [JP] Japan .................. 58-219530

[51] Int. Cl.$^4$ ............................... G01D 15/14
[52] U.S. Cl. ...................... 430/273; 430/945; 430/961; 369/284; 369/286; 369/288; 346/135.1
[58] Field of Search ............ 428/64, 65; 430/945, 430/273, 961; 369/284, 286, 288; 346/135.1

[56] References Cited

U.S. PATENT DOCUMENTS

| 4,069,487 | 1/1978 | Kasai et al. ............ 346/135.1 |
| 4,237,468 | 12/1980 | Nahara et al. . |
| 4,317,123 | 2/1982 | Namiki et al. ......... 346/135.1 |
| 4,460,665 | 7/1984 | Kunikane et al. ...... 430/945 X |
| 4,464,502 | 8/1984 | Jacobs ................... 524/432 X |

FOREIGN PATENT DOCUMENTS 0083991 7/1983 European Pat. Off. .
2005457 4/1979 United Kingdom .

Primary Examiner—Alexander S. Thomas
Attorney, Agent, or Firm—Flynn, Thiel, Boutell & Tanis

[57] ABSTRACT

The present invention relates to an optical information recording medium comprising a substrate, recording layer and protective layer, characterized in that said protective layer comprises, as the main components, a high molecular compound and at least one of record-promoting agents selected from the group of (a) explosive material, (b) plasticizer, (c) organic low molecular compound having a melting point not higher than 140° C., and (d) light-absorbing material.

19 Claims, 1 Drawing Sheet

OPTICAL INFORMATION RECORDING MEDIUM

This is a continuation of application Ser. No. 666,401, filed Oct. 30, 1984, now abandoned.

BACKGROUND OF THE INVENTION

The present invention relates to an optical information recording medium usable for writing and reading with a light beam such as laser.

Recently, various optical information recording media for recording information and regenerating the recorded information by irradiating a light beam have been studied, and have been gradually produced into merchandise.

An optical information recording medium is usually composed of a disk-like substrate having a light reflective recording layer thereon. Since the recording layer easily deteriorates by the action of air or is damaged by abrasion, it has been tried to place a protective layer on the recording layer to prevent these deteriorations. For example, Japanese Patent Application Laid Open Nos. 57-60542 and 57-66541 disclose these techniques, but various properties such as sensitivity, C/N, contrast and the like are lowered and a satisfactory product can not be obtained up to now.

Another conventional method for protecting a recording layer uses a "sandwich structure". This comprises two recording media having the above mentioned structure (two recording layers are not always necessary) and sealing two recording layers in the inside by having the two layers face toward each other and having intervening air therebetween. This structure has a merit of avoiding damage by direct abrasion, but has a demerit of a weak mechanical strength due to the sandwich structure.

SUMMARY OF THE INVENTION

An object of the present invention is to provide an optical information recording medium comprising a substrate, a recording layer and a protective layer, characterized in that said protective layer comprises, as the main components, a high molecular compound and at least one of record-promoting agents selected from the group of (a) explosive material, (b) plasticizer, (c) organic low molecular compound having a melting point not higher than 140° C., and (d) light-absorbing material.

The optical information recording medium of the present invention has various excellent properties in respect of recording sensitivity, C/N, contrast and mechanical strength, and is not easily damaged by abrasion and other factors.

DETAILED DESCRIPTION OF THE INVENTION

The substrate materials used in the present invention may be those well known to those skilled in the art and may be either transparent or opaque to the laser beam used. However, in case where writing record is effected from the substrate side with laser beam, the substrate material must be transparent to writing laser beam. On the other hand, in case where writing record is effected from the side opposite to the substrate, namely from the surface of the recording layer, there is no necessity that the substrate material should be transparent to writing laser beam. However, in case where reading regeneration is carried out with a transparent light, the substrate must be transparent to reading laser beam. In case where reading regeneration is carried out with a catoptric light, substrate material may be either transparent or opaque to reading laser beam. Referring to the quality of the substrate material, there may be employed the supports generally used for recording elements made of glass, quartz, ceramics, plastics, paper, plate-like or foil-like metal and the like. Among them, plastics are particularly suitable in the points of safety, improved recording sensitivity, flatness, light weight, workability and the like. The typical plastics include vinyl chloride resin, vinyl acetate resin, acrylic resin, methacrylic resin, polyester resin, nitrocellulose, polyethylene resin, polypropylene resin, polyamide resin, polystyrene resin, polycarbonate resin, epoxy resin and the like.

If desired, an under-coat layer may be applied between a substrate and a recording layer. In order to guide a laser light, a guide track groove (pre-groove) may also be applied on the substrate or the under-coat layer. A substrate may be formed by injection molding, pressing and other methods. An under-coat layer may be formed by pressing or transferring by the use of a light-curable resin.

The recording medium of the present invention has functions of writing (recording) information by absorbing light beam and of reading (regenerating) information by reflecting light beam. These two functions may be effected by a single layer, or the two functions may be effected separately by an absorbing layer and a reflecting layer.

Materials for forming a recording layer are not specially limited, but may be any of organic and inorganic materials. Examples of these materials are listed below.

Inorganic Material: low melting metals such as Bi, Te, In, Sn, Sb, Pb and their alloys, or low melting metal compounds such as TeOx, SnOx, TeC and the like;

Organic Material: triphenyl methane type coloring matter, phthalocyanine type coloring matter, cyanine type coloring matter, merocyanine type coloring matter, naphthoquinone type coloring matter, anthraquinone type coloring matter, dioxadine type coloring matter, xanthene type coloring matter, indanthrene type coloring matter, phenanthrene type coloring matter, and the like.

Organic material is generally superior to metallic material in respect of oxygen-resistance and stability. Among the organic materials, cyanine type coloring matter is particularly preferable because it has a strong absorbing power and stability. Any "cyanine type coloring matter" which is known in the photochemical field, may be used. These materials are described, for example, in U.S. Pat. Nos. 3,916,069; 2,503,776; 2,666,761; and 2,739,964. Examples of materials having a heterocyclic ring include thiazole type, benzothiazole type, naphthothiazole type, thionaphthenethiazole type, oxazole type, benzoxazole type, naphthoxazole type, selenazole type, benzoselenazole type, naphthoselenazole type, thiazoline type, oxazoline type, selenazoline type, quinoline type, indolenine type, pyridine type, and benzoimidazole type.

Among them, indolenine type cyanine coloring matter is particularly preferable because of its stability. Examples of the indolenine type coloring matter include:

1,3,3-trimethyl-2-(7-(1,3,3-trimethyl-2-indolinilidene)-1,3,5-heptatrienyl)-indolium perchlorate, 1,3,3-trimethyl-2-(7-(1,3,3-trimethyl-2-benz(e)in-
dolinilidene)-1,3,5-heptatrienyl)-benz(e)indolium per-
chlorate,
1,3,3-trimethyl-2-(7-(1,3,3-trimethyl-5-chloro-
indolinilidene)-1,3,5-heptatrienyl)-5-chloro-indium
perchlorate,
1,3,3-trimethyl-2-(7-(1,3,3-trimethyl-2-benz(g)in-
dolinilidene)-1,3,5-heptatrienyl)-benz(g)indolium p-
toluene sulphonate,
1,3,3-trimethyl-2-(7-(1,3,3-trimethyl-2-indolinilidene)-
1,3,5-heptatrienyl)-indolium methylsulfate,
1,3,3-trimethyl-2-(7-(1,3,3-trimethyl-5,7-dichloro-2-
indolinilidene)-1,3,5-heptatrienyl)-5,7-dichloro-
indolium perchlorate,
1,3,3-trimethyl-2-(7-(1,3,3-trimethyl-5-bromo-2-
indolinilidene)-1,3,5-heptatrienyl)-5-bromoindolinili-
dene ethylsulfate,
1,3,3,5-tetramethyl-2-(7-(1,3,3,5-tetramethyl-
indolinilidene)-1,3,5-heptatrienyl)-indolium perchlo-
rate,
1,3,3-trimethyl-2-(7-(1,3,3-trimethyl-5-chloro-
indolinilidene)-1,3,5-heptatrienyl)-5-chloro-indolium
iodide,
1-(4-sodiumsulphonatebutyl)-3,3-dimethyl-2-(7-(1-sul-
phonatebutyl)-3,3-dimethyl-5-chloro-indolinilidene)-
1,3,5-heptatrienyl)-5-chloroindolium, and the like.

One or two or more of these materials are used. If desired, they may be used in combination with a binder and/or other additives. The binder used herein may optionally be selected from materials for forming a protective layer illustrated hereinafter. Examples of the other additives optionally used in a recording layer include an antioxidant such as phenol resin or a transition metal complex such as bis(3,4,5,6-tetrachloro-1,2-dithiophenyl)nickel.

The thickness of a recording layer is not specially limited, but suitably 100–5000 Å (0.01–0.5 μm), preferably 100–1000 Å (0.01–0.1 μm), more preferably 200–600 Å (0.02–0.06 μm). When this thickness is less than 100 Å, both reflectivity and absorbancy are lowered and a satisfactory recording can not be effected. On the other hand, when the recording layer is too thick, energy required for recording becomes too large, thus inconvenience being raised.

The protective layer of the present invention is fully illustrated hereinafter.

The thickness of a protective layer is not specially limited, but suitably about 0.5–500 μm, preferably 10–200 μm. When the protective layer is thicker than 500 μm, any inconvenience is not specially raised, but it is useless. On the other hand, if the thickness is less than 0.5 μm, a satisfactory mechanical strength is not obtained.

High molecular compounds used for forming a protective layer are not specially limited, but may be any of organic and inorganic compounds.

Examples of these compounds include: glass emulsion, polyether, polyvinylether, diacetone acrylamide polymer, terpene, picolite, cumarone-indene resin, polyvinyl alcohol, polyvinyl butyral, petroleum resin, polyester, rubber type resin, polyolefin (polyethylene, polypropylene), polyolefin copolymer, ethylene-vinylchloride copolymer, acetal resin, polyvinyl acetal type resin, acrylic resin, methacrylic resin, polyacrylonitrile, acrylonitrile copolymer, cellulose resin, polyamide, polystyrene, polystyrene copolymer, styrene type polymer (p-methylstyrene, 2,5-dichlorostyrene), polyphenylene oxide, polyvinyl chloride, polyvinyl acetate, polyvinyl acetate copolymer, phenoxy resin, vinylchloride-vinylacetate copolymer, ethylene-vinylacetate copolymer, polyvinylidene chloride, vinylidene chloride copolymer, polyvinyl formal, polycarbonate, polysulfone, epoxy resin, melamine resin, phenol resin, polyurethane, diallyl phthalate resin, polybutadiene, urea resin, silicone resin, chloroprene resin, rubber, paraffin, cellulose derivatives and the like.

One or more of these compounds can be used alone or in combination.

In addition to these high molecular compounds, other additives may be contained in a protective layer. Examples of these additives include filter elements such as dyes, pigments and the like; mechanical strength reinforcing elements such as fillers and the like; preservation stabilizers such as antioxidant and the like.

The protective layer of the present invention may be applied on the recording layer by coating a solution or dispersion obtained by dissolving or dispersing high molecular compounds and other additives such as record-promoting agents in an organic solvent. Examples of the organic solvents include 1,2-dichloroethane, carbon tetrachloride, acetone, methyl ethyl ketone, toluene, methanol, ethanol, hexane, water and the like. Coating is carried out in a usual manner such as spraying, roller coating, dipping, rotary coating, spin-coating and the like.

A record-promoting agent which is included in a protective layer is described in more detail hereinafter.

A "record-promoting agent" used herein, when irradiated by light, gives thermal influence on a recording layer, thereby promoting the change of the shape of the recording layer and thus promoting the formation of pits on the recording layer.

One or more of record-promoting agents selected from the group of (a) explosive material, (b) plasticizer, (c) low molecular organic compound having a melting point lower than 140° C. and (d) light-absorbing material can be used alone or in combination in a protective layer.

Examples of a record-promoting agent include as follows:

(a) Explosive Material:

The explosive material used in the protective layer is a material which generally provides thermodynamically unstable equilibrium state and causes a rapid pressure increase therearound by making a reaction when a certain amount of energy is applied. This material is explosive as a single compound per se, and is optionally selected according to the physical properties of the other materials contained in a protective layer and those of the materials contained in a recording layer.

Examples of the explosive materials used herein include nitrocellulose, trinitrobenzene, trinitrophenol, trinitrotoluene, trinitrobenzoic acid, dinitrophenol, silver chlorite, silver amide, silver azide, silver nitride, silver carbide, silver nitrite, and the like.

One or more of these explosive materials can be used alone or in combination. A weight ratio of an explosive material to a high molecular material in a protective layer is suitably about 0.05–0.70 to 1, preferably about 0.20–0.60 to 1. If this ratio exceeds 0.70, the mechanical strength of the protective layer is lowered. On the other hand, when this ratio is less than 0.05, various properties such as sensitivity, C/N, contrast and the like deteriorates.

When a light beam is irradiated to a recording layer, it is absorbed and converted to heat, thereby causing exothermal reaction of an explosive material in a protective layer. Thus, the formation of pits on the recording layer is promoted.

(b) Plasticizer:

The plasticizer used herein is one generally known as a plasticizer for an organic high molecular compound, and is optionally selected depending on the physical properties of the organic high molecular compound used.

Examples of the plasticizer include:

(1) Phosphoric acid ester: triethyl phosphate, tributyl phosphate, trioxyl phosphate, tri-2-ethylhexyl phosphate, triphenyl phosphate, tricrecyl phosphate, (tributoxyethyl) phosphate, (trichloropropyl) phosphate, (octyldiphenyl) phosphate, (trisisopropylphenyl) phosphate, (tris-$\beta$-chloroethyl) phosphate;

(2) Phthalic acid ester: lauryl phthalate, dimethyl phthalate, diethyl phthalate, dibutyl phthalate, diheptyl phthalate, di-n-octyl phthalate, diisooctyl phthalate, dicapryl phthalate, dilauryl phthalate, di-2-ethylhexyl phthalate, dioctyldecyl phthalate, diisodecyl phthalate, butylbenzyl phthalate, buthoxyethyl phthalate, dicyclohexyl phthalate;

(3) Aliphatic acid ester: butyl oleate, tetrahydrofurfuryl oleate, glycerine monooleate, dibutyl adipate, dioctyl adipate, diisodecyl adipate, n-hexyl adipate, di-2-ethylhexyl adipate, di(butyl-diglycol)adipate, di-2-ethylhexyl azelate, di-2-ethylhexyl maleate, dibutyl maleate, dibutyl fumarate, acetyltriethyl citrate, acetyltributylcitrate, trimellit-tri-2-ethylhexyl, trimellit-trioctyl;

(4) Dihydric alcohol ester: diethyleneglycol dibenzoate, triethyleneglycol di-2-ethyl butyrate, triethyleneglycol di-2-ethyl hexoate;

(5) Oxyacid ester: methyl acetylricinoleate, butyl acetylricinoleate, methoxyethyl acetylricinoleate, butylphthalybutyl glycolate, tri(2-ethylhexyl) acetylricinoleate;

(6) Polyester type: propyleneglycol adipate, 1,3-butyleneglycol adipate;

(7) Epoxy type: alkyl epoxystearate, epoxytriglyceride;

(8) Others: chlorinated paraffin, chlorinated biphenyl, 2-nitrobiphenyl, nonyl naphthalene, o- and p-toluene sulfoamide, methyl abietate, camphor.

One or two or more of these plasticizer may be used alone or in combination. The amount used is suitably about 10–80%, preferably about 20–60% to the total weight of the protective layer. When the amount of the plasticizer exceeds 80%, a bad influence appears on the preservability of a recording layer. On the other hand, when this amount is less than 10%, such properties as sensitivity, C/N, contrast and the like deteriorate.

(c) Low molecular organic compound having a melting point lower than 140° C.:

Examples of the low molecular organic compound include acetanilide, benzotriazol, phenacetin, dimedone, benzoic acid, sebacic acid, citric acid cinnamic acid, maltose, tribenzylamine, naphthalene, benzidine, benzil, benzophenone, p-biphenyl amine, N-bromoacetamide, gluconic acid, methyl acetanilide, 3,4-benzphenanthrene, emetine, phenanthroline, 2,2'-dipyridil, phenanthrene, Ditamine, methylacetpyronone, 2-ethyl-2-phenyl glutarimide, hexadecyl,3-hydroxy-2-naphthoate, 2(alpha-hydroxypropyl)piperidine, p-dimethylaminoazobenzene, p-dimethylaminobenzaldehyde and the like.

Any form of a protective layer (for example single layer or two layers) may be used if the protective layer contains at least one of the above mentioned high molecular organic compounds and at least one of the above mentioned low molecular organic compounds.

The low molecular organic compound is added in an amount of 0.5–50% by weight, preferably 5–25% by weight to the high molecular organic compound.

The protective layer is prepared by coating a solution obtained by dissolving the materials of the protective layer in an appropriate solvent on the surface of a recording layer. The low molecular organic compound in the protective layer thus prepared in accordance with the present invention melts at a low temperature, and is favourably miscible with the material of pit part. Moreover, the protective layer of the present invention has no bad influence on properties such as sensitivity, contrast, S/N and the like.

(d) Light-absorbing Material:

Any light-absorbing material may be used if it absorbs light in the wavelength range of a laser light used. For example, organic coloring matters for forming a recording layer as illustrated above can be used. When a semiconductor laser is used, cyanine coloring matter (see Japanese Patent Application Laid Open No. 58-112790), metal complex, indanthrene compound and the like are particularly preferable.

Typical examples of the light-absorbing materials include 1-methyl-2-(7-(1-methyl-3,3-dimethyl-5-chloro-2-indolinilidene)-1,3,5-heptatrienyl)-3,3-dimethyl-5-chloro-indoliumperchlorate, 1-methyl-2-(7-(1-methyl-3,3-dimethyl-2-indolinilidene)-1,3,5-heptatrienyl)-3,3-dimethyl-indolium chloride, 1-n-octyl-2-(7-(1-n-octyl-3,3-dimethyl-5-chloro-2-indolinilidene)-1,3,5-heptatrienyl)-3,3-dimethyl-5-chloro-indolium perchlorate, 1-methyl-2-(7-(1-methyl-3,3-dimethyl-5,7-dichloro-2-indolinilidene)-1,3,5-heptatrienyl)-5,7-dichloroindolium perchlorate, bis(trimethyl-1,2-dithiophenyl)nickeltetrabutyl ammonium salt, bis(trichloro-1,2-dithiophenyl)nickeltetra(4-hydroxy butyl) ammonium salt, bis(4-diethylaminodithiobenzyl)nickel, bis(3,4,5,6-tetrachloro-1,2-dithiophenyl)nickeltetrabutylammnium salt, bis(4-dimethylaminodithiobenzyl)nickel, 8,17-bis(2-methoxyphenylamino)indanthrene, 8,17-bisphenylthioindanthrene.

One or more of the above light-absorbing materials can be used alone or in combination.

The light-absorbing material of the present invention absorbs a part of laser beam passing through a recording layer to a protective layer, thereby raising temperature and softening a binder (high molecular organic compound). Thus, the formation of pits on a recording layer is promoted. The light-absorbing material used herein is mixed with a binder and forms a film. The above mentioned high molecular organic compounds used for forming a protective layer are used as a binder.

A light-absorbing material is used in a weight ratio of 0.03–0.4/1, preferably 0.1–0.3/1 to a binder. If the amount of the light-absorbing material is less than the above weight ratio, light is not satisfactorily absorbed and a desired effect can not be achieved. On the other hand, if the amount of the light-absorbing amount is more than the above weight ratio, a mechanical strength is lowered and a protective layer therefore becomes ineffective.

The basic structure of the optical information recording medium of the present invention comprises forming firstly a recording layer and secondly a protective layer on a substrate. A second protective layer may further be applied on the pre-formed protective layer of the basic structure. If desired, an undercoat layer, adhesive layer, pre-groove layer(guide track), or surface treating layer of a substrate may optionally be applied.

FIG. 1 shows the basic structure of the optical information recording medium of the present invention, wherein 1 indicates a substrate; 2 a recording layer; and 3 a protective layer. Various modifications can be conceived from the basic structure of FIG. 1. For example, FIG. 2 shows a modification additionally using an adhesive layer and a cover substrate, wherein 1 indicates a substrate; 2 a recording layer; 3 a protective layer; 4 a cover substrate; and 5 an adhesive layer. FIG. 3 shows another modification, wherein 1, 1' indicate a substrate; 2, 2' a recording layer; and 3' a protective layer (this layer may play both parts of a protective layer and an adhesive layer). The material of the cover substrate 4 may optionally be selected from the above mentioned materials for a substrate 1. Examples of the material for the adhesive layer include epoxy type adhesive, silicone type adhesive, wax type adhesive and the like.

A recording layer may be applied on a substrate in a usual manner such as vacuum vapor-deposition, sputtering or conventional coating methods, for example spin-coating, spray-coating and dipping, depending on the properties of the components used.

A light beam used for writing and reading information on the optional information recording medium of the present invention is preferably a laser beam such as Ne, He-Cd, Ar, He-Ne, ruby, semi-conductor laser or dye laser. Among them, the semi-conductor laser is suitable specially from the view points of light weight, easiness of handling, compactness and the like.

DESCRIPTION OF THE PREFERRED EMBODIMENTS

Figure 1:
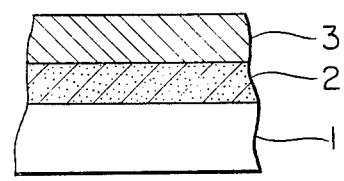
FIG. 1 is a sectional view showing the basic structure of the optical information recording medium of the present invention.
Figure 2:
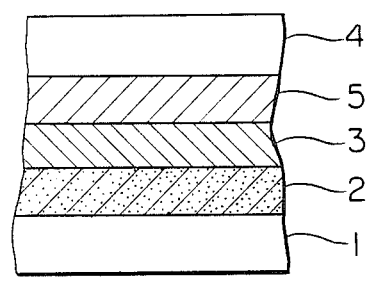
FIGS. 2 and 3 show the modified structures of the present invention.
Figure 3:
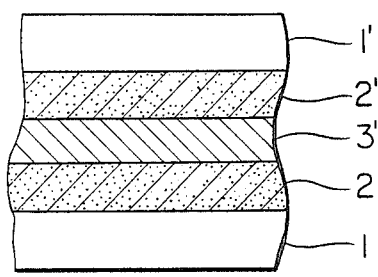

The present invention is further illustrated by the following Examples and Comparative Examples, but the present invention is not limited thereto.

EXAMPLE 1

A recording layer of a thickness of about 55 nm having a guide track was formed on a polymethylmethacrylate substrate of a thickness of 1.2 mm by rotary coating with a solution obtained by dissolving 0.7 weight % of 1-methyl-2-(7-(1,3,3-trimethyl-5-chloro-2-indolinilidene)-1,3,5-heptatrienyl)-3,3-dimethyl-5-chloroindolium perchlorate cyanine coloring matter in 1,2-dichloroethane and thereafter drying.

The recording layer thus formed was further coated by dipping process with a solution obtained by dissolving 10 weight % of ethylene-vinylacetate copolymer ("EV-250" of Sumitomo Chemical Co., Ltd.) and 5 weight % of trinitrophenol in carbon tetrachloride and drying to form a protective layer having a thickness of about 13 $\mu$m, thus preparing a recording medium of the present invention.

The recording medium thus prepared was irradiated by a semi-conductor laser at a linear velocity of 1.24 m/sec, a beam diameter of 1.54 $\mu$m and a recording frequency of 0.7 MH to record a signal. As this result, the recording of the signal could be effected at a recording face power (writing power) of 4.2 mW. The measured values for reflectivity and C/N are shown in the following Table I.

COMPARATIVE EXAMPLE 1

The same procedure as in Example 1 was repeated, except that trinitrophenol was not contained in the protective layer. As this result, an energy necessary for recording (recording face power) was 8.0 mW.

EXAMPLE 2

The same procedure as in Example 1 was repeated, except that a dispersion obtained by dispersing 10 weight % of copper azide in a carbon tetrachloride solution containing 15 weight % of petroleum resin ("Neopolymer S" of Nippon Oil Co., Ltd.) was used as a solution for forming a protective layer. A recording face power was 5.0 mW.

EXAMPLE 3

The same procedure as in Example 1 was repeated, except that the protective layer was bonded with polybutene adhesive. A recording face power was 4.5 mW.

EXAMPLE 4

Tellurium was vapor-deposited on a polymethylmethacrylate substrate of a thickness of 1.5 mm having a guide track, thus forming a recording layer of a thickness of about 30 nm. A solution obtained by dissolving 5 weight % of silver chlorite in an aqueous solution of 10% polyvinyl alcohol was coated on said recording layer by dipping process and was dried to form a protective layer of a thickness of about 20 um, thus producing a recording medium of the present invention.

A signal was recorded on this recording medium by irradiating an He-Ne laser at a linear velocity of 1.24 m/sec, a beam diameter of 1.60 $\mu$m and a recording frequency of 0.7 MHz. The recording of the signal could be effected by a recording face power of 3.6 mW.

COMPARATIVE EXAMPLE 2

The same procedure was repeated as in Example 4, except that silver chlorite was not contained in the protective layer. A recording face power was 10.5 mW.

EXAMPLE 5

A solution obtained by dissolving 0.6 weight % of 1-methyl-2-(5-(1-methyl-2-quinolinidene)-1,3-pentadienyl)-quinolium chloride and 0.05 weight % of bis(3,4,5,6-tetrachloro-1,2-dithiophenyl)nickel tetrabutylammonium in dichloromethane was coated on a glass substrate having a guide track of light curable resin by dipping process and was dried, thus forming a recording layer of a thickness of about 50 nm. A solution containing 15 weight % of polystyrene resin ("Pycolastic P-160" of Esso Standard) and 6 weight % of trinitrobenzene was then coated on said recording layer by dipping process and was dried to form a protective layer of about 3 $\mu$m, thus producing a recording medium of the present invention.

The property of this recording medium was measured in the same manner as in Example 1. A recording surface power was 4.1 mW.

The results of Examples 1 to 5 and Comparative Examples 1 to 2 are shown in Table I.

TABLE I

|  | Initial Properties | | |
|---|---|---|---|
|  | Reflectivity (%) | Writing Power (mW) | C/N (dB) |
| Example 1 | 28 | 4.2 | 52 |
| Example 2 | 28 | 5.0 | 52 |
| Example 3 | 28 | 4.5 | 54 |
| Example 4 | 52 | 3.6 | 49 |
| Example 5 | 26 | 4.1 | 51 |
| Comparative Ex. 1 | 28 | 8.0 | 54 |
| Comparative Ex. 2 | 51 | 10.5 | 52 |

As clearly seen from Table I, an energy required for recording a signal on the recording media of the present invention is only about ½ of that required on the comparative recording media. That is, it can be seen that a signal recording on a recording medium having a protective layer containing an explosive material as in the present invention is easily effected and that the sensitivity of the recording medium is superior. The presence of the protective layer prevents a recording layer from damage, dirt and dust. Thus, the desired effect of the present invention is achieved.

EXAMPLE 6

Tellurium was vapor-deposited to a thickness of about 400 Å on a polymethylmethacrylate substrate of a thickness of 1.2 mm. A solution obtained by dissolving 6% by weight of polystyrene and 4% by weight of dibutyl phthalate in 1,2-dichloroethane was further coated on the tellurium-deposited substrate and was dried to form a protective layer of a thickness of about 5 μm, thus preparing a recording medium of the present invention.

To the substrate side of the recording medium thus prepared, a semi-conductor laser of 790 nm wavelength was irradiated by stopping at 1.6 μm, at a recording frequency of 0.5 MHz and a linear velocity of 1.5 m/sec to measure initial properties of reflectivity (%) and a writing (recording) power. Furthermore, C/N was measured by regenerating at a direct current of 0.2 mW.

This recording medium was then left for 7 days under environmental conditions of 60° C. and 90% relative humidity (RH) to conduct a preservation test and to measure various properties in the same manner as above. The results of these measurements are shown in the following Table II.

COMPARATIVE EXAMPLE 3

A recording medium was prepared to measure various properties thereof in the same manner as in Example 6, except that a protective layer was not formed.

The results of the measurements are shown in Table II.

COMPARATIVE EXAMPLE 4

A recording medium was prepared to measure various properties thereof in the same manner as in Example 6, except that dibutyl phthalate was not included in a protective layer. The results of the measurements are shown in Table II.

EXAMPLE 7

A solution prepared by dissolving 1.5% by weight of 1-methyl-2-(7-(1-methyl-2-benzthiazolinidene)-1,3,5--heptatrienyl)-benzthiazoliumbromide as a cyanine coloring matter in 1,2-dichloroethane was coated on a polymethylmethacrylate substrate of a thickness of 1.2 mm by a spinner coating machine to form a recording layer of a thickness of about 450 Å. A solution obtained by dissolving 5% by weight of ethylene/vinylacetate copolymer (EV-250 of Sumitomo Chemical Co., Ltd.) and 5% by weight of methoxyethyl acetylricinoleate in carbon tetrachloride was then coated on the above formed recording layer to form the first protective layer of a thickness of 3 μm and acryl emulsion (F-320 of Asahi Kasei) was coated thereover to form the second protective layer of a thickness of 20 μm, thus preparing a recording medium of the present invention.

Various properties of this recording medium were measured in the same manner as in Example 6. The recording medium was then irradiated by a tungsten light of 54000 Lux for 20 hours and the same measurements were carried out.

The results of the measurements are shown in Table II.

COMPARATIVE EXAMPLE 5

A recording medium was prepared to measure various properties thereof in the same manner as in Example 7, except that a protective layer was not formed.

The results of the measurements are shown in Table II.

COMPARATIVE EXAMPLE 6

A recording medium was prepared to measure various properties thereof in the same manner as in Example 7, except that methoxyethyl acetylricinoleate was not included in a protective layer.

The results of the measurements are shown in Table II.

EXAMPLE 8

A recording medium was prepared to measure various properties thereof in the same manner as in Example 7, except that 2,2-indo-6,7,6',7'-benzotricarbocyanine perchlorate was used as a cyanine coloring matter and tetrahydrofurfuryl oleate was used as a plasticizer.

The results of the measurements are shown in Table II.

COMPARATIVE EXAMPLE 7

A recording medium was prepared to measure various properties thereof in the same manner as in Example 8, except that a protective layer was not formed.

The results of the measurements are shown in Table II.

COMPARATIVE EXAMPLE 8

A recording medium was prepared to measure various properties thereof in the same manner as in Example 8, except that tetrahydrofurfuryl oleate was not included in a protective layer.

The results of the measurements are shown in Table II.

EXAMPLE 9

A recording medium was prepared in the same manner as in Example 6, except that a solution obtained by dissolving 6.5% by weight of chloroprene resin and 3.5% by weight of dibutyl maleate in 1,2-dichloroethane was used as a protective layer-forming solution to form a protective layer of a thickness of 8 μm.

The results of the measurements conducted in the same manner as in Example 7 are shown in Table II.

EXAMPLE 10

A recording medium was prepared in the same manner as in Example 6, except that a solution obtained by dissolving 5.0% by weight of polyvinyl butyral and 5.0% by weight of diethylene glycol dibenzoate in methanol was used as a protective layer-forming solution to form a protective layer of a thickness of 10 μm.

The results of the measurements conducted in the same manner as in Example 7 are shown in Table II.

EXAMPLE 11

A recording medium was prepared in the same manner as in Example 7, except that a solution obtained by dissolving 6.5% by weight of chloroprene resin and 3.5% by weight of dibutyl maleate in 1,2-dichloroethane was used as a protective layer-forming solution to form a protective layer of a thickness of 8 μm.

The results of the measurements are shown in Table II.

EXAMPLE 12

A recording medium was prepared in the same manner as in Example 7, except that a solution obtained by dissolving 5.0% by weight of polyvinyl butyral and 5.0% by weight of diethylene glycol dibenzoate in methanol was used as a protective layer-forming solution to form a protective layer of a thickness of 10 μm.

The results of the measurements are shown in Table II.

EXAMPLE 13

A recording medium was prepared in the same manner as in Example 7, except that a solution obtained by dissolving 5.0% by weight of acrylic resin (Delpet 60N) and 5.0% by weight of acetyltriethyl citrate in carbon tetrachloride was used as a protective layer forming solution to form a protective layer of a thickness of 12 μm.

Various properties were measured in the same manner as above. The results of the measurements are shown in Table II.

EXAMPLE 14

A recording medium was prepared in the same manner as in Example 8, except that a solution obtained by dissolving 5.5% by weight of chloroprene and 4.5% by weight of 1,3-butylene glycol adipate in carbon tetrachloride was used as a protective layer forming solution to form a protective layer of a thickness of 9 μm.

Various properties were measured in the same manner as above. The results of the measurements are shown in Table II.

EXAMPLE 15

A recording medium was prepared in the same manner as in Example 8, except that a solution obtained by dissolving 6.5% by weight of petroleum resin (Neopolymer S of Nippon Oil Co., Ltd.) and 3.5% by weight of chlorinated paraffin in hexane was used as a protective layer forming solution to form a protective layer of a thickness of 8 μm.

Various properties were measured in the same manner as above. The results of the measurements are shown in Table II.

EXAMPLE 16

A recording medium was prepared in the same manner as in Example 7, except that 1,2-dichloroethane solution containing 1.2% by weight of 1,3,3-trimethyl-2-(7-(1,3,3-trimethyl-5-chloro-indolinilidene)-1,3,5-heptatrienyl)-5-chloro-indolium perchlorate and 15% by weight of nickel complex (PA-1006 of Mitubishi Yuka) was used to form a recording layer.

Various properties were measured in the same manner as above. The results of the measurements are shown in Table II.

TABLE II

| | Initial Properties | | | Properties after Preservation | | | | | |
|---|---|---|---|---|---|---|---|---|---|
| | | | | Resistance to Heat and Humidity | | | Light Resistance | | |
| | Reflectivity (%) | Writing Power (mW) | C/N (dB) | Reflectivity (%) | Writing Power (mW) | C/N (dB) | Reflectivity (%) | Writing Power (mW) | C/N (dB) |
| Ex. 6 | 56 | 3.8 | 47 | 49 | 4.0 | 44 | — | — | — |
| Ex. 7 | 26 | 3.2 | 52 | 22 | 3.2 | 48 | 24 | 3.2 | 50 |
| Ex. 8 | 27 | 3.2 | 53 | 23 | 3.2 | 51 | 25 | 3.2 | 51 |
| Ex. 9 | 55 | 3.6 | 49 | 46 | 4.2 | 40 | 53 | 3.6 | 47 |
| Ex. 10 | 56 | 3.9 | 47 | 45 | 4.3 | 40 | 54 | 3.9 | 45 |
| Ex. 11 | 27 | 3.2 | 52 | 26 | 3.5 | 50 | 24 | 3.4 | 50 |
| Ex. 12 | 27 | 3.2 | 53 | 25 | 3.4 | 49 | 24 | 3.5 | 50 |
| Ex. 13 | 25 | 3.2 | 51 | 23 | 3.5 | 50 | 22 | 3.5 | 49 |
| Ex. 14 | 25 | 3.6 | 51 | 23 | 4.0 | 50 | 22 | 3.7 | 51 |
| Ex. 15 | 25 | 3.4 | 52 | 23 | 3.8 | 50 | 23 | 3.6 | 50 |
| Ex. 16 | 26 | 3.0 | 53 | 25 | 3.2 | 52 | 24 | 3.3 | 51 |
| Comparative Ex. 3 | 55 | 2.5 | 52 | 9 | failure | failure | — | — | — |
| Comparative Ex. 4 | 56 | 7.0 | 32 | 49 | 7.0 | 28 | — | — | — |
| Comparative Ex. 5 | 27 | 2.3 | 56 | 20 | 2.3 | 50 | 9 | failure | failure |
| Comparative Ex. 6 | 26 | 7.0 | 32 | 22 | 7.0 | 30 | 24 | 7.0 | 30 |
| Comparative Ex. 7 | 28 | 2.3 | 58 | 24 | 2.3 | 52 | 14 | 3.0 | 28 |
| Comparative Ex. 8 | 27 | 7.0 | 33 | 26 | 7.0 | 32 | 25 | 7.0 | 31 |

As clearly seen from Table II, the recording medium having a protective layer containing a plasticizer of the present invention has no bad influence on the reflectivity. Moreover, the recording medium of the present invention can be recorded by a smaller writing power, and has a larger C/N value indicating a resolving power as compared with the comparative recording medium having a protective layer containing no plasticizer. These characteristics can be observed in both the initial property test and the test after preservation. The competitive recording medium having no protective layer has too poor properties for practical use after preservation.

Thus, the recording medium of the present invention has no conventional defects, and protects a recording layer from the deterioration and damage. The recording medium of the present invention moreover has a satisfactory sensitivity, C/N value, contrast and mechanical strength.

EXAMPLE 17

$SiO_2$ was vapor-deposited to a thickness of 2000 Å on a polymethylmethacrylate substrate having a thickness of 1.2 mm, and Te was further deposited thereon to a thickness of 400 Å. 1,2-dichloroethane solution containing 7% by weight of chloroprene and 3% by weight of phenanthroline was further coated by dipping on the substrate thus treated to form an over-coat layer having a thickness of 13 um. Saran Resin (X202 of Asahi Dow) was further coated thereon to a thickness of 50 μm, thus forming an optical information recording medium. This recording medium was irradiated for writing from the substrate side by a semi-conductor laser (790 nm) at a linear velocity of 1.5 m/sec and a recording frequency of 0.5 MHz, and was regenerated at a direct current of 0.2 mW to measure C/N. The same measurement was conducted with this recording medium after preserving at 60° C. in the atmosphere of 90% of relative humidity (R.H.) for 2 weeks.

EXAMPLE 18

An optical information recording medium was prepared in the same manner as in Example 17, except that a 1,2-dichloroethane solution containing 1% by weight of a compound having the chemical structure,

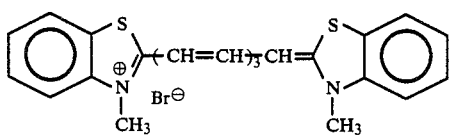

as a cyanine coloring matter was coated by spin-coating to form a recording layer of a thickness of 450 Å in place of the Te layer and a carbon tetrachloride solution containing 14% by weight of ethylene/vinyl acetate copolymer (EV-150) and 3.5% by weight of maltose was further coated by dipping to form an over-coat layer having a thickness of 25 μm.

The initial properties of this recording medium were measured in the same manner as in Example 17. This recording medium was left under a tungsten light of 54000 Lux for 20 hours, and the same measurement was conducted.

EXAMPLE 19

A recording medium was prepared in the same manner as in Example 18, except that a compound having the chemical structure,

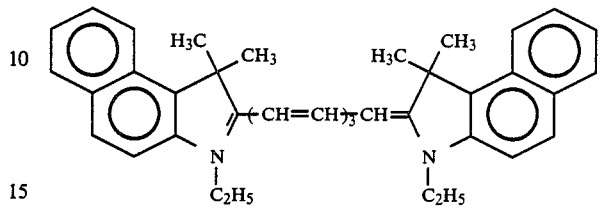

is used as a cyanine coloring matter in place of the cyanine coloring matter of Example 18.

EXAMPLE 20

A recording medium was prepared in the same manner as in Example 17, except that $Te_{90}Se_{10}$ was used in place of Te and that benzoic acid was used in place of phenanthroline.

EXAMPLE 21

A recording medium was prepared in the same manner as in Example 18, except that a compound having the chemical structure,

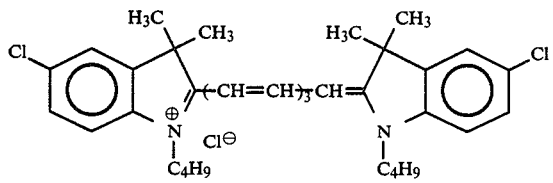

was used as a cyanine coloring matter in place of the cyanine coloring matter of Example 18.

EXAMPLE 22

A recording medium was prepared in the same manner as in Example 21, except that 3,4-benzphenanthrene was used in place of maltose in the first protective layer of Example 21.

COMPARATIVE EXAMPLE 9

A recording medium was prepared in the same manner as in Example 17, except that chloroprene was used alone in place of the mixture of chloroprene and phenanthrene in Example 17.

COMPARATIVE EXAMPLE 10

A recording medium was prepared in the same manner as in Example 17, except that the over coat layer was not applied.

COMPARATIVE EXAMPLE 11

A recording medium was prepared in the same manner as in Example 18, except that an ethylene-vinyl acetate copolymer was used in place of the maltose-containing ethylene-vinyl acetate copolymer in Example 18.

COMPARATIVE EXAMPLE 12

A recording medium was prepared in the same manner as in Example 18, except that the over-coat layer was not applied.

COMPARATIVE EXAMPLE 13

A recording medium was prepared in the same manner as in Example 19, except that the over-coat layer was not applied.

With regard to the recording media thus prepared, various properties were measured in the same manner as above, and the results are shown in the following Table III.

TABLE III

|  | Initial Properties | | | Properties after Deterioration Test | | |
| --- | --- | --- | --- | --- | --- | --- |
|  | Reflectivity (%) | Writing Power (mW) | C/N (dB) | Reflectivity (%) | Writing Power (mW) | C/N (dB) |
| Ex. 17 | 56 | 3.5 | 44 | 55 | 3.5 | 43 |
| Ex. 18 | 28 | 3.0 | 52 | 24 | 3.0 | 50 |
| Ex. 19 | 26 | 3.0 | 51 | 23 | 3.0 | 48 |
| Ex. 20 | 52 | 3.75 | 43 | 50 | 4.0 | 40 |
| Ex. 21 | 26 | 3.0 | 51 | 25 | 3.2 | 49 |
| Ex. 22 | 26 | 3.0 | 51 | 24 | 3.3 | 49 |
| Comparative Ex. 9 | 57 | 7.0 | 28 | 56 | 7.0 | 26 |
| Comparative Ex. 10 | 56 | 2.5 | 48 | 11 | unmeasurable | |
| Comparative Ex. 11 | 27 | 6.5 | 33 | 24 | 7.0 | 29 |
| Comparative Ex. 12 | 27 | 2.3 | 58 | 14 | unmeasurable | |
| Comparative Ex. 13 | 26 | 2.3 | 58 | 13 | 4.2 | 36 |

As can be seen from the above Table III, the preservability of the recording media of the present invention was improved by the presence of protective layers, but various properties such as recording sensitivity, C/N, contrast and the like do not deteriorate.

EXAMPLE 23

A recording layer of a thickness of 500 Å was formed by rotary coating a 1,2-dichloroethane solution containing 0.6% by weight of 1-methyl-2-(7-(1-methyl-3,3-dimethyl-5-chloro-2-indolinilidene)-1,3,5-heptatrienyl)-3,3-dimethyl-5-chloroindolium perchlorate on an acrylic resin substrate having a guide track of a light-curable resin.

A protective layer of a thickness of 3 μm was further applied on the recording layer by coating a carbon tetrachloride solution containing 10% by weight of ethylene-vinyl acetate copolymer and 1% by weight of 1-isopentyl-2-(7-(1-isopenthyl-3,3-dimethyl-5-chloro-2-indolinilidene)-1,3,5-heptatrienyl)-3,3-dimethyl-5-chloroindolium chloride by dipping process.

A signal was recorded on the recording medium thus prepared by a semi-conductor laser at a linear velocity of 1.24 m/sec, beam diameter of 1.54 μm and recording frequency of 0.7 MHz. The recording of the signal was effected by a recording surface power of 4.0 mW.

EXAMPLE 24

The same procedure of Example 23 was repeated, except that 1-n-octyl-2-(7-(1-n-octyl-3,3-dimethyl-5-chloro-2-indolinilidene)-1,3, 5-heptatrienyl)-3,3-dimethyl-5-chloroindolium bromide was used in place of the light-absorbing agent of Example 23. The recording of the signal could be effected by a recording surface power of 3.7 mW.

EXAMPLE 25

An acrylic resin cover was applied on the protective layer of the recording medium of Example 23 by using a polybutene bonding agent. The same measurement as in Example 23 was conducted with the recording medium thus prepared. A recording could be effected at a recording surface power of 4.2 mW.

EXAMPLE 26

The same procedure as in Example 23 was repeated, except that bis(3,4,5,6-tetrachloro-1,2-dithiophenyl) nickel was used in place of the light-absorbing agent of Example 23. A recording could be effected at a recording surface power of 4.0 mW.

COMPARATIVE EXAMPLE 14

The same procedure as in Example 23 was repeated, except that the protective layer was prepared from ethylene-vinyl acetate copolymer alone. A recording face power required for recording was 8 mW.

As can be seen from Examples 23 to 26 and Comparative Example 14, the recording sensitivity of the recording medium of the present invention can be improved by incorporating a light-absorbing agent in a protective layer.

We claim:

1. In an optical information recording medium comprising a substrate, a light-reflective recording layer comprising a cyanine organic coloring matter and a protective layer, the improvement which comprises: said protective layer comprises, as the main components, a high molecular weight binder and a plasticizer, said plasticizer being used in an amount of 20-60% by weight, based on the total weight of the protective layer, and said plasticizer being selected from the group consisting of phosphoric acid ester plasticizers, phthalic acid ester plasticizers, aliphatic acid ester plasticizers, dihydric alcohol ester plasticizers, oxyacid ester plasticizers, chlorinated paraffin, chlorinated biphenyl and 2-nitrobiphenyl.

2. The optical information recording medium according to claim 1, wherein said protective layer has a thickness of 0.5 μm–500 μm.

3. The optical information recording medium according to claim 1, wherein said protective layer has a thickness of 10 μm–200 μm.

4. The optical information recording medium according to claim 1, wherein said plasticizer is a phthalic acid ester.

5. The optical information recording medium according to claim 1, wherein said plasticizer is an aliphatic acid ester.

6. The optical information recording medium according to claim 1, wherein said plasticizer is a dihydric alcohol ester.

7. The optical information recording medium according to claim 1, wherein said plasticizer is an oxyacid ester.

8. The optical information recording medium according to claim 1, wherein said recording layer also contains a resin.

9. The optical information recording medium according to claim 1, wherein said recording layer consists of a cyanine colorant.

10. The optical information recording medium according to claim 9, wherein said cyanine colorant is an indolenine colorant.

11. The optical information recording medium according to claim 10, wherein said indolenine colorant is 1-methyl-2-(7-(1-methyl-3,3'-dimethyl-5-halo-2-indolinilidene)-1,3,5-heptatrienyl)-3,3-dimethyl-5-halo-indolium perchlorate.

12. The optical information recording medium according to claim 10, wherein said recording layer is applied to spin-coating.

13. The optical information recording medium according to claim 1, wherein said recording layer has a thickness of 100–5000 Å.

14. The optical information recording medium according to claim 1, wherein said recording layer has a thickness of 100–1000 Å.

15. The optical information recording medium according to claim 1, wherein said recording layer has a thickness of 200–600 Å.

16. An optical information recording medium comprising: a support; a light-sensitive recording layer on said support, said recording layer consisting essentially of indolenine cyanine colorant, said recording layer having a thickness of from 200 to 600 Angstrom units; and a protective layer covering said recording layer, said protective layer having a thickness of from 10 to 200 micrometers and consisting essentially of a blend of a binder resin and a plasticizer for said binder resin, said plasticizer comprising from 20 to 60% by weight of the total weight of said protective layer and being selected from the group consisting of phosphoric acid ester plasticizers, phthalic acid ester plasticizers, aliphatic acid ester plasticizers, dihydric alcohol ester plasticizers, oxyacid ester plasticizers, chlorinated paraffin, chlorinated biphenyl and 2-nitrobiphenyl.

17. An optical information recording medium as claimed in claim 16 in which said plasticizer is selected from the group consisting of dibutyl phthalate, methoxyethyl acetylricinoloeate, tetrahydrofurfuryl oleate, dibutyl maleate, diethylene glycol dibenzoate, acetyltriethyl citrate, 1,3-butylene glycol adipate and chlorinated paraffin.

18. An optical information recording medium as claimed in claim 16 in which said plasticizer is methoxyethyl acetylricinoleate.

19. An optical information recording medium as claimed in claim 16 in which said plasticizer is tetrahydrofurfuryl oleate.

* * * * *

UNITED STATES PATENT AND TRADEMARK OFFICE
CERTIFICATE OF CORRECTION

PATENT NO. : 4 752 554
DATED : June 21, 1988
INVENTOR(S) : Tsutomu SATO et al

It is certified that error appears in the above-identified patent and that said Letters Patent is hereby corrected as shown below:

Column 17, line 33; change "applied to" to ---applied by---.

Signed and Sealed this

Thirteenth Day of September, 1988

Attest:

DONALD J. QUIGG

*Attesting Officer*    *Commissioner of Patents and Trademarks*